United States Patent [19]
Whitaker

[11] Patent Number: 5,195,146
[45] Date of Patent: Mar. 16, 1993

[54] PHOTOELECTRIC READER FOR COMPUTER COMPATIBLE CHARACTERS

[76] Inventor: Ranald O. Whitaker, 128 St. Kitts Way, Apollo Beach, Fla. 33572

[21] Appl. No.: 561,946

[22] Filed: Dec. 15, 1983

[51] Int. Cl.$^5$ .............................................. G06K 9/00
[52] U.S. Cl. ...................................... 382/11; 235/472
[58] Field of Search .............................. 382/11, 24, 67; 235/472, 473; 250/227

[56] References Cited

U.S. PATENT DOCUMENTS

| | | | |
|---|---|---|---|
| 3,603,930 | 9/1971 | Britt | 340/146.3 J |
| 3,738,487 | 6/1973 | Way et al. | 209/80.5 |
| 3,800,282 | 3/1974 | Acker | 340/146.3 Z |
| 4,159,471 | 6/1979 | Whitaker | 340/711 |

Primary Examiner—Leo H. Boudreau

[57] ABSTRACT

Recently proposed computer compatible numerals are used in this invention. Their use permits a photoreader for reading the code column of coding sheets to be built for $25.00. The particular numerals used are composed of line elements drawn from a master numeral comprising the three sides of an isosceles triangle plus the altitude dropped to the base. The four elements form a hexadecimal numeral. These numerals appear in pairs in the code column. A pair of indicia appear next each pair of numerals. A scanner having seven photoelectric sensors scans the column from top to bottom, sensing (1) which elements are present and (2) which indicium is present. A processor uses this information to develop a respective 8-bit computer word for each pair of numerals scanned. The system is adaptable for reading other types of input. An equivalent system may be used to read rows of computer compatible characters consisting of eight or ten elements each.

12 Claims, 7 Drawing Sheets

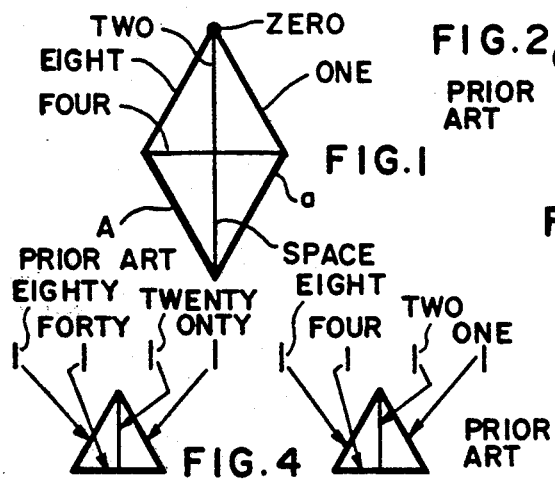
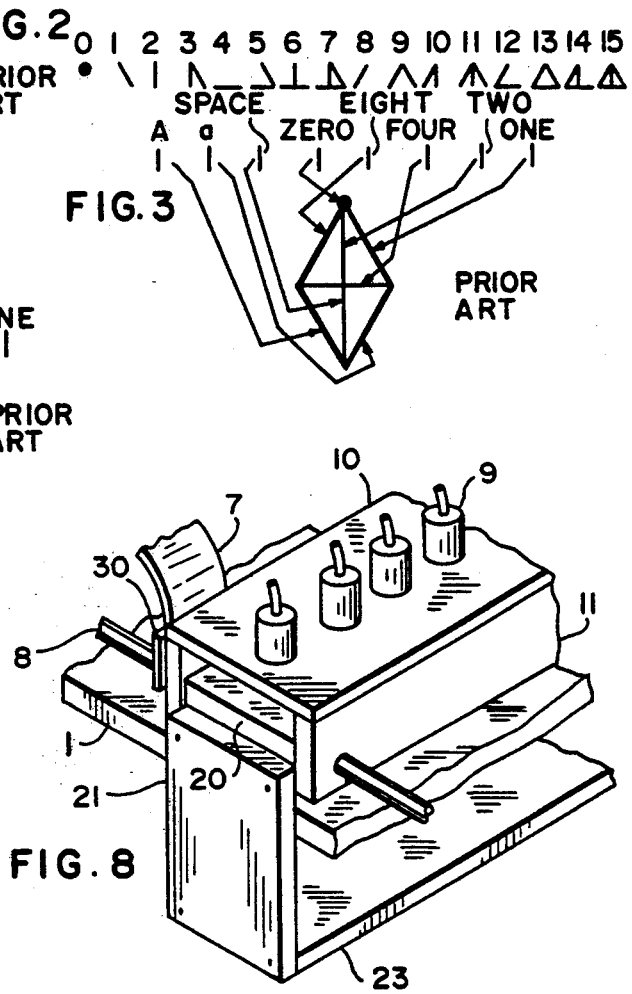
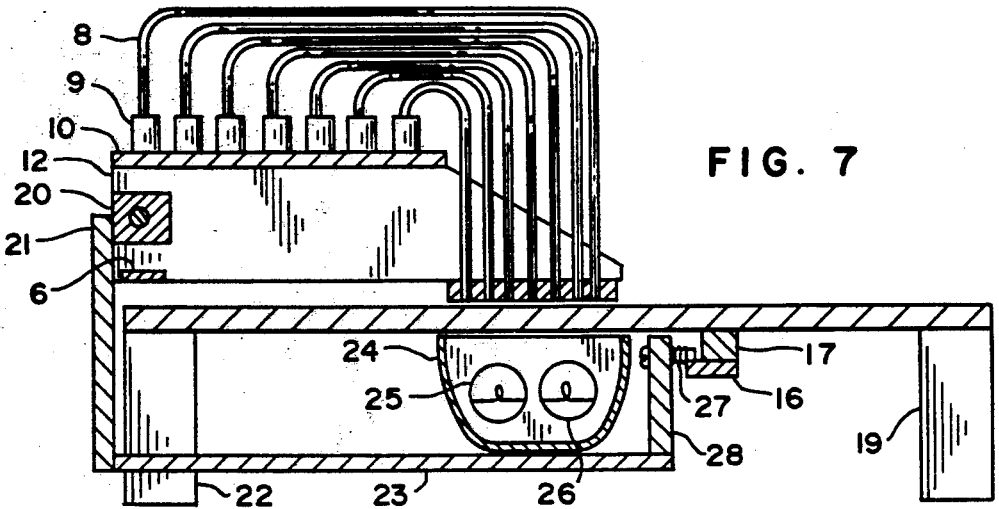

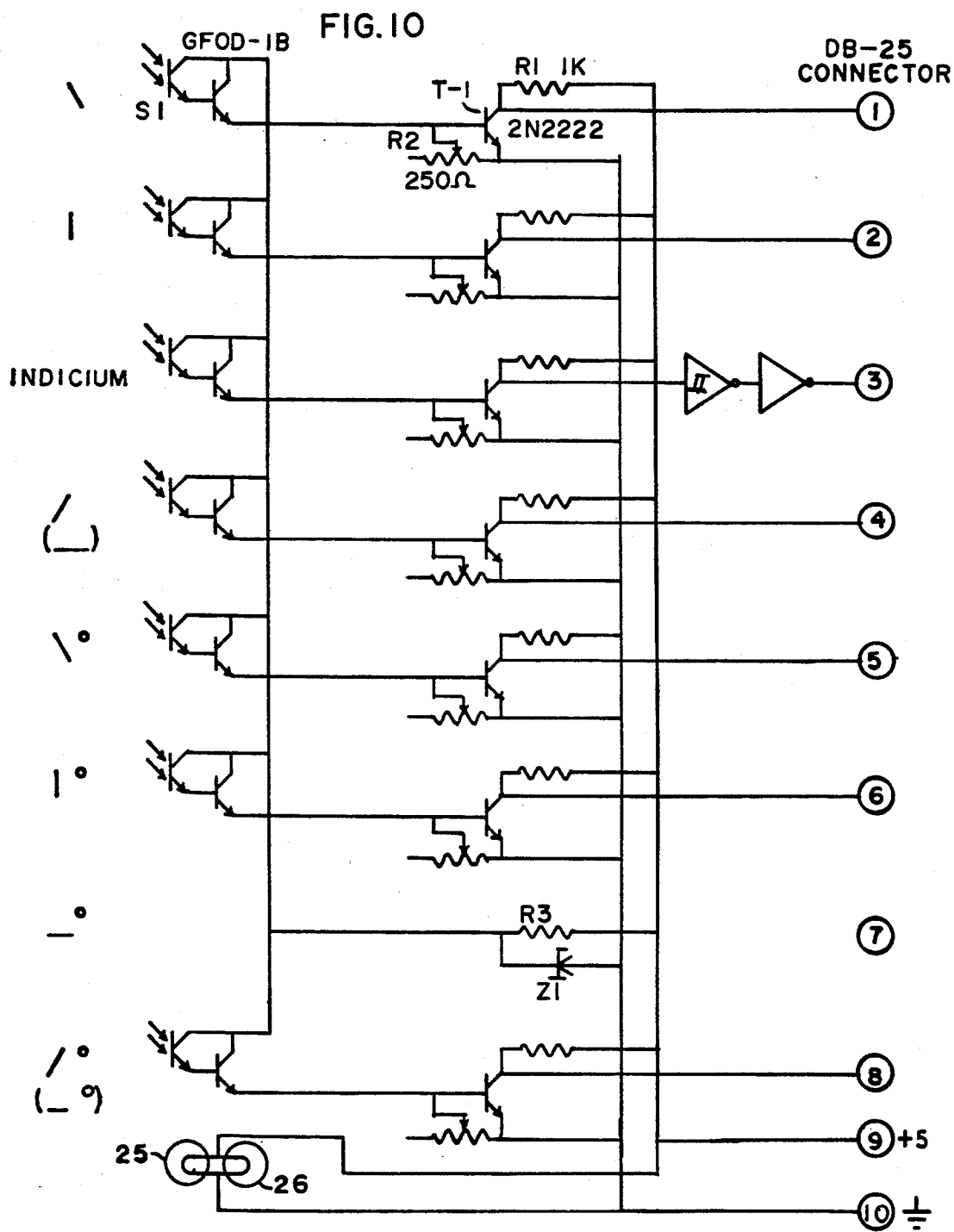

PHOTOELECTRIC READER FOR COMPUTER COMPATIBLE CHARACTERS

BACKGROUND

The first computer compatible characters of which I know were proposed by a gentleman in Prague about 1955. Since then several persons here in the States have proposed alternate configurations of such characters. The particular configuration of present interest was proposed several years ago (see U.S. Pat. No. 4,159,471) and appears to have significant advantages over other configurations. The master character of this set of characters is shown in FIG. 1. As indicated by that figure, a computer compatible character consists of a plurality of discrete elements. The character is computer compatible since each element can have a respective bit in a computer word. This bit is HI if and only if its respective element is PRESENT in the respective character.

The "EIGHT" at upper left of FIG. 1 means that the element indicated (when appearing by itself) is a numeral and represents the number "eight". The "A" at lower left means that the element designated (when appearing by itself) is to be ascribed the same meaning as the Roman letter "A". Likewise for the remaining elements. Subsets of the elements are to be combined to form other characters of the set of characters.

Combining the four numerical elements forms numerals of the hexadecimal numbering system. See FIG. 2. The number represented by each numeral is the sum of the weights of the elements present in that numeral. This is the second requirement for a set of characters to be "computer-compatible".

Combining the eight elements of FIG. 1 in all possible combinations permits a total of one hundred (hexadecimal) characters to be formed.

Combining the "A" with the numerical elements (including the Zero) forms an upper case alphabet—with a few characters left over. Combining the "a" element with the numerical elements forms a lower case alphabet. Over ninety (hexadecimal) characters are presently unassigned. They could be used to represent a host of phonemes.

The preferred bit assignment for the elements of the 8-element character is given in FIG. 3. The least significant bit corresponds to the "one" line. The most significant bit corresponds to the "A" line.

To memorize names for the full complement of one hundred (hex) characters would be difficult. It is also impossible—because there are no names for the unassigned characters. The problem is solved by breaking the 8-bit character into two hex numerals—as shown in FIG. 4. This technique is generally used in specifying bit patterns for computer words. The numerals of the hexadecimal numbering system together with their preferred names are given in FIG. 5. The numeral for "15" contains all the elements—it is a "master numeral".

SUMMARY

A very economical and simple reader ($25.00) for photo-electrically reading code on a computer coding sheet is provided. Pairs of computer compatible numerals are entered in the code column. A pair of indicia appear next each pair of numerals. A scanner having seven photoelectric sensors moves down the column of numerals and indicia, sensing which elements are present in each numeral and sensing which indicia appear. The computer compatible numeral employed is an isosceles triangle with altitude dropped to the base—four elements. In an alternate embodiment, rows of computer compatible characters having eight or ten elements each are read.

The immediate object of the invention is to provide a very economical photoreader for reading the coding column of a computer coding sheet and feeding the resultant information to a computer. Entries on the coding sheet consist of pencil written computer compatible numerals.

The more general object is to provide the mechanics of a photoreader for reading computer compatible characters in general.

THE FIGURES

FIG. 1 shows the master character of a set of computer compatible characters of the type used in the present invention.

FIG. 2 shows the computer compatible numerals of the hexadecimal numbering system together with their Arabic equivalents.

FIG. 3 shows the preferred bit assignment for an eight bit computer word represented by a computer compatible character.

FIG. 4 shows the preferred bit assignment for an eight bit computer word represented by two computer compatible numerals.

FIG. 5 is a table giving preferred names for the numerals of the hexadecimal numbering system.

FIG. 7 is a view partially in section and particularly showing the carriage which carries the light source.

FIG. 8 is an isometric view of the carriage showing coupling of the carriage to the guide.

FIG. 10 is a schematic diagram of the electronics.

FIG. 13 is an illustration of a typical program to be read by the photoreader. Program illustrated is that used in the present invention—used to "adapt" the controller for generating those signals which will cause the processor to direct the reading of the numerals and storing the resultant computer words in memory.

FIG. 14 is the second and last page of the program.

THE PREFERRED EMBODIMENT

Principles of Reading

In the preferred embodiment the entries in the code column of a computer code sheet are read. Such a sheet is item 2 of FIG. 6. The code is in computer compatible numerals and appears in the center of the sheet. Each pair of numerals constitutes an entry. The reader reads each entry and forms a respective 8-bit computer word. Since each line (element) of the numerals has a respective bit in the computer word, reading consists of sensing which lines are present in an entry and setting their respective bits in the respective computer word. This word is contained in an "output register".

Figure 16:
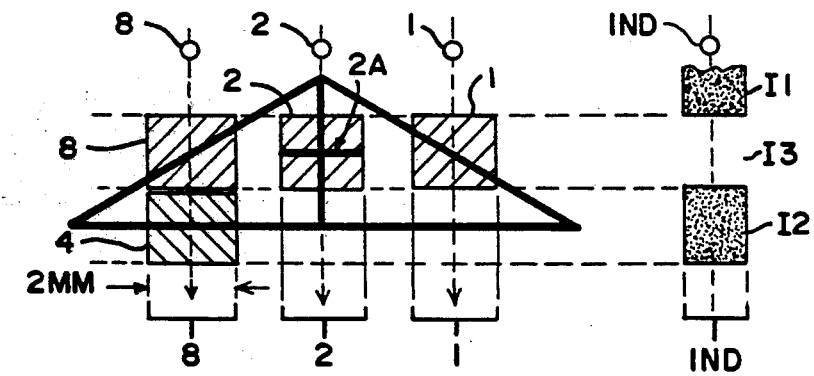
FIG. 16 is a sketch of a computer coding sheet and showing a numeral, its indicia, scanning paths, scanning zones, and scanning blocks.

See FIG. 16. The 1, 2, and 8 sensors (optical fibers feeding to photodetectors and indicated at the top of FIG. 16) scan down the sheet along their respective dotted lines. At the same time, the IND (indicium) sensor scans along its dotted line. The following actions take place.

1. If the 1 sensor sees black while the IND sensor sees white, the 1 bit in the output register is set.

2. If the 2 sensor sees black while the IND sensor sees white, the 2 bit in the output register is set.

3. If the 8 sensor sees black while the IND sensor sees white, the 8 bit in the output register is set.

4. If the 8 sensor sees black while the IND sensor sees black, the 4 bit in the output register is set.

5. When the IND sensor moves from black to white, the computer is signaled that reading is complete and the word in the output register may be delivered to a receiving device. The computer then resets the output register preparatory to reading the next character pair.

Indicia I1 and I2 of FIG. 16 are called "Mark" indicia—in conformance with Teletype terminology. The space between is called a "Space". In layman's language the Mark would be called an indicium and the Space would not be called anything. It seems preferable to refer to the indicia as a Mark and Space—although it may be well argued that the Space is not an indicium, that it is a "nothing".

Optical fibers 1, 2, 8, and IND of FIG. 16 are 1 mm in diameter. The Mark indicia are 2 mm wide. Consequently the Marks will be read even though horizontal registry (due to lateral displacement of paper or printing being improperly distanced from the edge of the paper) be off by ½ mm. If horizontal registry is off more than ½ mm, then the numerals will not be read. It follows that for each element of the numeral, there is a respective "Read Block". These are the hatched blocks of FIG. 16. Each is as wide as the Mark indicium. The indicia define horizontal Zones—indicated by horizontal dotted lines. Upper and lower limits of Blocks 1, 2, 4, and 8 are defined by the limits of these Zones.

It follows that writing of the numerals may be quite slipshod. There are only two requirements.

1. Each line must pass laterally across its respective Block.

2. No line may enter an alien Read Block.

The first requirement is easily met by the 1, 4, and 8 lines. But the 2 line does not pass laterally across its respective Read Block. A preferred solution to this problem is to place the crossbar 2A on the 2 line—as shown in FIG. 16. A second solution is to cant the numeral so that the 2 line slants across the Block.

Figure 9:
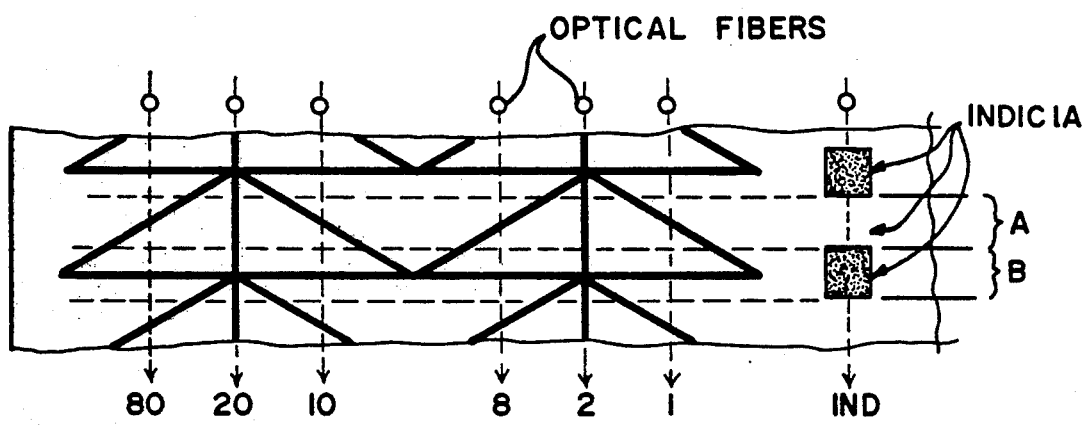
FIG. 9 is a sketch of a portion of a computer coding sheet and showing numerals, indicia, and scanning zones.

One pair of indicia permits both numerals of an entry to be read—as indicated in FIG. 9. The Mark of the pair defines the second Zone. The Space defines the first Zone. Each constitutes a code for identifying its respective Zone. For the character of FIG. 1, three zones will be required. This necessitates another pair of indicia. If five zones were necessary, then three pair of indicia would be required. Each zone for such a character would contain three indicia. This set of three indicia would constitute a code for the respective zone.

Reader Structure

Figure 6:
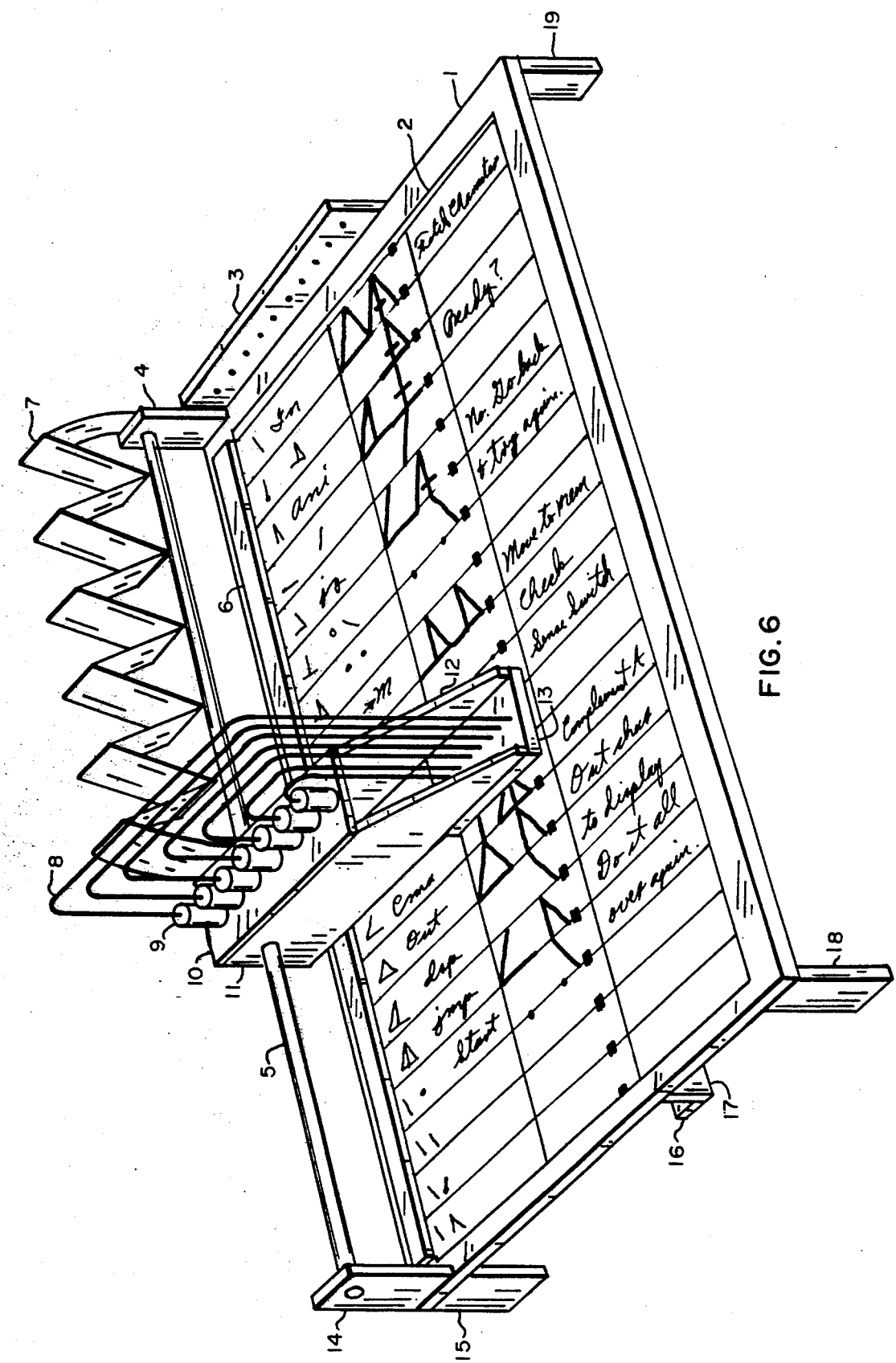
FIG. 6 is a perspective view of the prototype reader.

See FIG. 6.

Platen 1 is a transparent plastic plate. It is supported by Legs 15, 18, and 19. A fourth leg (Leg 22) appears in FIG. 7.

Ends 14 and 4 are affixed to Platen 1.

Guide 5 is a round steel rod some 6 mm in diameter. It is fixed in Ends 14 and 4.

The Scanner is made up of Sides 11 and 12, Top 10, Faceplate 13, Photosensor 9 plus six additional photosensors, and Optical Fiber 8 plus six additional optical fibers. The scanner is referred to by numeral 11.

Terminal Board 3 provides electrical connections to external equipment.

Ribbon Cable 7 provides electrical connections to Scanner 11.

Descender 17 is a plastic strip passing the length of Scanner 11. It is affixed to Platen 1.

Slide 16 is a plastic strip passing the length of Scanner 11 and affixed to Descender 17.

One end of Optical Fiber 8 feeds to Photosensor 9. The other terminates in Faceplate 13 in such position that it senses the indicia appearing on Code Sheet 2. Other fibers terminate in Faceplate 13 at such points that they scan respective elements of the two numerals.

The structure is such that Scanner 11 may be moved to the top of the page and drawn down the length of the page—Faceplate 13 gliding over the numerals to be read.

Reading Procedure

1. Scanner 11 is rotated counterclockwise about Guide 5.

2. Code Sheet 2 is inserted—left edge pressing against Stop 6. This assures proper registry.

3. Scanner 11 is moved to the top of the Reader and dropped so that Faceplate 13 presses against Code Sheet 2.

4. The electronics is activated and Scanner 11 drawn down the page. This reads the code column into the computer.

5. The electronics is deactivated. Scanner 11 lifted from the Code Sheet. And Code Sheet 2 withdrawn.

The Light Source

Light for the reading process is supplied by a source under Platen 1. Lamps are carried on a carriage which moves in unison with Scanner 11.

As shown in FIG. 7, Light Bulbs 25 and 26 are carried in Reflector 24.

Reflector 24 is affixed to Bottom 23.

Bottom 23 is affixed to Back 21.

Back 21 is affixed to Slider 20. Slider 20 slides on Guide 5. Slider 20 lies between Sides 11 and 12. This insures that the carriage moves with Scanner 11. This best indicated in FIG. 8.

Riser 28 is affixed to Bottom 23.

Screw 27 is affixed to Riser 28. A smooth end portion of Screw 27 slides on Slide 16.

The arrangement is such that, as Scanner 11 moves down the page, the carriage bearing Light Bulbs 25 and 26 moves with Scanner 11, keeping Bulbs 25 and 26 directly opposite Faceplate 13.

In FIG. 8, Clamp 30 holds Ribbon Cable 7 tight against Side 12.

Details of How the System Works

Each pair of numerals on the code sheet constitutes a "character subset". Each character subset plus its associated indicia constitute and entry.

Scanner 11 scans each entry from top to bottom. In doing so it forms a series of reader words—RWD's. Each RWD comprises the outputs of the several sensors (including the indicium sensor) at each particular instant.

Figure 11:
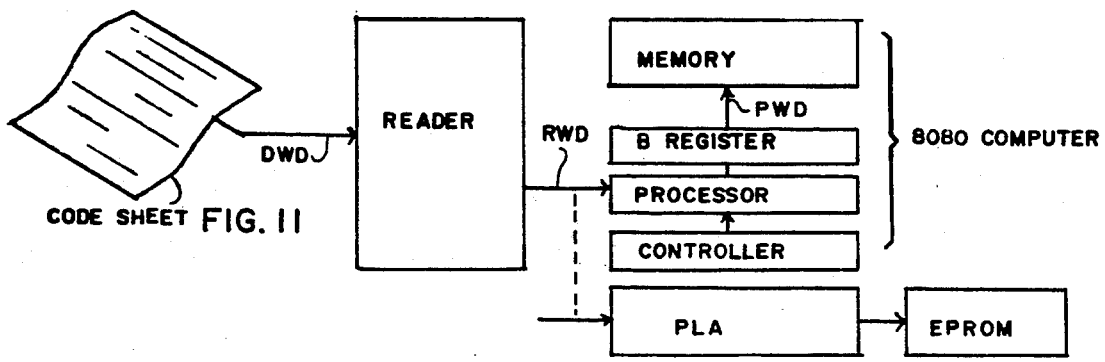
FIG. 11 is a system block diagram.

The Processor of FIG. 11 accepts this train of RWD's, performs a logic analysis on each, and develops a Processor Word (PWD). The PWD is contained in the B Register of FIG. 11. This register is the Output Register of the System. Whenever the reader sees a particular character element, the system moves the respective bit of the B Register to its HI state. At completion of the scan of the entry, the B register holds the PWD equivalent of the entry. The processor then delivers the PWD to memory or other receiver, and resets the B register preparatory to reading the next entry.

Pre-Printed Form

To facilitate proper placement of numerals, the pre-printed form generally bears dots at the end points of all possible character elements. Characters are entered by using a dull lead pencil to connect appropriate pairs of dots. Mark indicia are preprinted.

Modification of Numeral Configuration

The preferred configuration of computer compatible numerals is an equilateral triangle with altitude dropped to the base. See the master numeral at right of FIG. 4. To improve performance of the reader, I flattened the triangle and added the crossbar. Further improvement in performance could be realized by making further changes in the configuration of the numeral. However, radical departure from the configuration could cause loss of general advantages of the basic numeral—all elements of each numeral are contiguous and all numerals (except the six and eleven) can be written without lifting the pencil from the paper.

What Happens Between Entries

As the IND sensor leaves an indicium it senses a transition from black to white. This transition is used as an "End" signal indicating that an entry has been scanned and that scan of a new entry is beginning. In response to the transition, the processor moves the contents of the B register to memory and resets the register preparatory to receiving the next character.

What the Indicium Does

The top of the Mark indicium is at a level such that a normal user will never "write" a "four" element which is higher than the top of the Mark. This prevents a "four" element from being read as a one, two, or eight.

The bottom of the Mark is at a level such that the normal user will never write a "four" element which is lower than the bottom of the Mark. Consequently a "four" element will never be interpreted as an eight, two, or one of the following numeral. It is also at a level sufficiently low that the two fiber will not mistake an upper end of a one or eight element for a two element.

Alternate Terms Used in Describing the Binary States

Binary devices have been used in many differing technologies. Each technology has employed a term for each of the two states which term has particular utility to that technology. The electrical engineer working with flip-flops notes the output voltage is high for one state and low for the other. Consequently he uses "HI" and "LO" in describing the two states. The mathematician working with binary numbering systems uses "1" and "0". The old-time engineer remembering the day when relays were used as binary elements uses the terms "Set" and "Reset". In discussing the computer compatible numerals discussed herein I have used the terms "Present" and "Not Present". In discussing the reading of the indicia and elements, the terms "white" and "black" were used. An effort was made to use HI and LO throughout this Specification. However, it appeared ridiculous to speak of an element present in a particular numeral as being "HI". And when it is absent, speak of it as being "LO". It appeared best to change nomenclature back to that which befits the technology involved.

ELECTRONICS

The Electric circuitry is shown in FIG. 10.

Consider the top channel. Sensor S1 is a photodarlington—a GEFOD-1B (General Electric Fiber Optic Detector Type 1B). This unit gives a very high ratio of output current to input light—desired in this application. It is also slow—change in output current does not quickly follow change in input light. However, it is sufficiently fast for the present application.

Transistor T1 in response to the sensor signal generates a TTL compatible output.

R1 is a pullup resistor.

R2 is used to "zero" the system—it is adjusted so that the transistor switches reliably when the optical fiber moves from white to black or black to white. It compensates for change in temperature of the parts, change in ambient light, and differences in operational characteristics of the sensors.

All other channels except the third (indicium channel) are identical to channel 1. The indicium channel includes a Schmitt trigger. Recall that when the optical fiber for this channel moved from black to light, the computer terminated its reading of the character. If the transition from dark to light was "noisy" (not a nice smooth transition), then the computer concluded that the resultant "jumpy" signal indicated a series of characters had been read. Insertion of the Schmitt trigger eliminated this problem. The problem could have been handled in software.

R3 and Z1 near the bottom of the figure serve to drop the 5 volt supply to the 2.5 volts specified for use with the GEFOD-1B.

Lamps 25 and 26 connect across the 5 volt supply.

Since only seven sensors are used, one channel (Channel forty) is open.

OVERALL CONFIGURATION

In the preferred application the system is used for imputting programs to an IEEE 696 computer using an 8080 microprocessor and a Processor Technology 3P Plus S board.

The block diagram of such a system for reading computer compatible characters is given in FIG. 11. The processor accepts the RWD developed by the reader. Develops from it the PWD. And stores the last in computer memory. The controller is an Eprom—which is an electronic device in which charges, voltages, and conducting paths have been arranged in such manner that it will generate the desired sequence of commands. This arranging process is normally called "programming" and the plan in accordance with which the arranging is done is called a program.

FLOWCHART

Figure 12:
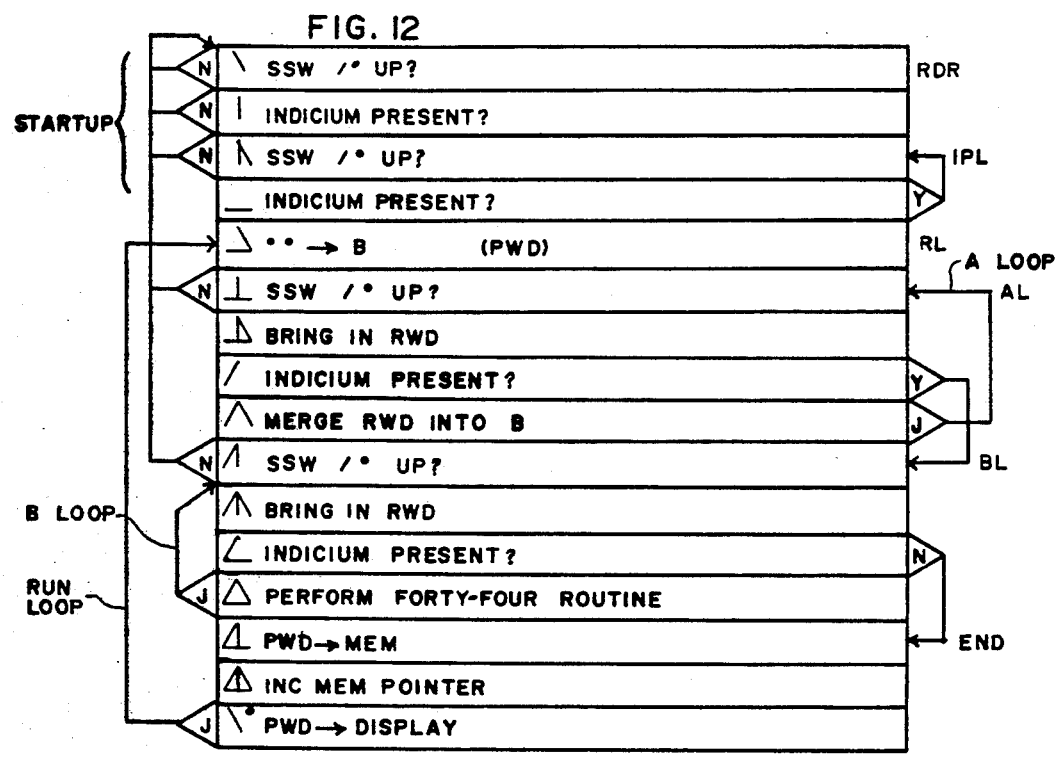
FIG. 12 is a flowchart indicating the actions which the controller causes.

The flowchart for the program used in the preferred system is given in FIG. 12. The following numbered comments pertain to respectively numbered blocks of the flowchart.

Blocks Six to Nine

These blocks form the "A" loop—the first of two main read loops. The system operates in this loop while scanning region A of FIG. 9.

Block Six

It is desirable that the operator be able to stop the reading anytime he so desires. He can do this by dropping Sense Switch eighty. Which jumps the processor out of this loop and back to Block One—which is a wait loop. Sense switch eighty is normally raised at the beginning of scan and dropped at the end of scan.

Block Eight

This is a check to see if the scanner is in region A of FIG. 16. If not, then the scanner is in region B and a jump is made to a program section which handles region B.

Block Nine

This merges the rwd into the pwd—as desired.

Blocks Ten to Thirteen

These blocks constitute the B loop. The system operates in this loop while scanning region B of FIG. 9. If the eight sensor sees black, the four sensor in the pwd is set. If the eighty sensor sees black, the forty bit in the pwd is set.

Block Five

This clears the B register preparatory to assembling the next pwd. This block plus the succeeding blocks constitute the RUN loop. The processor operates in the Run loop until Sense Switch eighty is dropped.

Blocks One to Four

These get the system started. Block one is a wait loop—waiting for the operator to raise Sense Switch eighty.

Block 2

This is a wait loop—waiting for the reader to see an indicium. The need for this bears explanation.

Note that at the apex of the digit, the one, two, and eight lines converge. The "two" sensor will indicate a presence of a two line if any of these lines were present. This is undesirable. The indicium inhibits all but the eight and eighty sensors. Hence the two sensor cannot cause the two bit in the pwd to become set at this time.

When the scanner moves past this indicium, Block Four moves the processor to the Run loop. The reader must observe one indicium before it begins to read.

Note that Sense Switch eighty is checked in every loop. Consequently, the operator can at any time halt the scanning process.

Startup may be anywhere on the coding sheet. The system will be inhibited until it has passed the lower edge of an indicium. Succeeding entries will be read.

Figure 13:
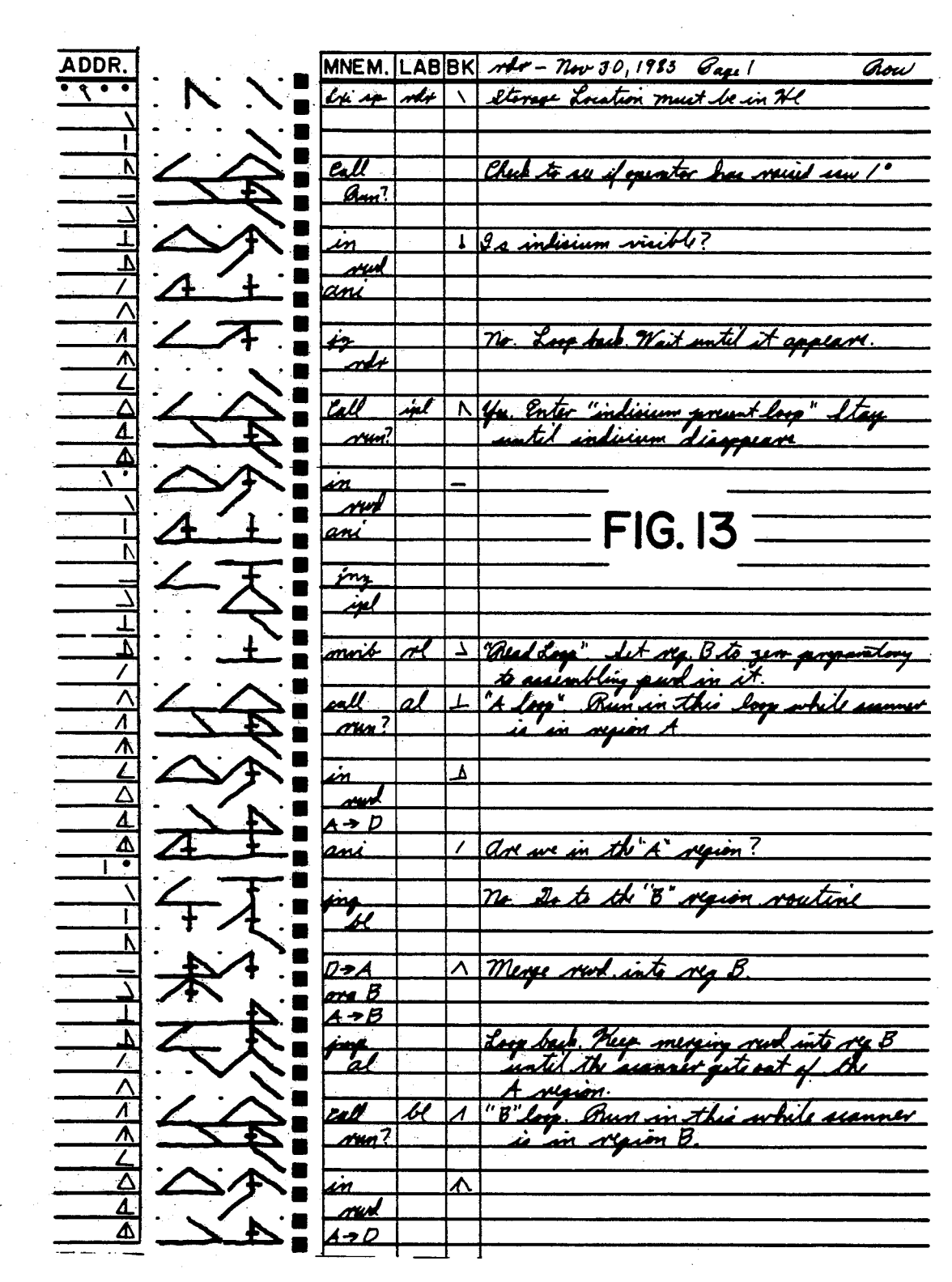
Figure 14:
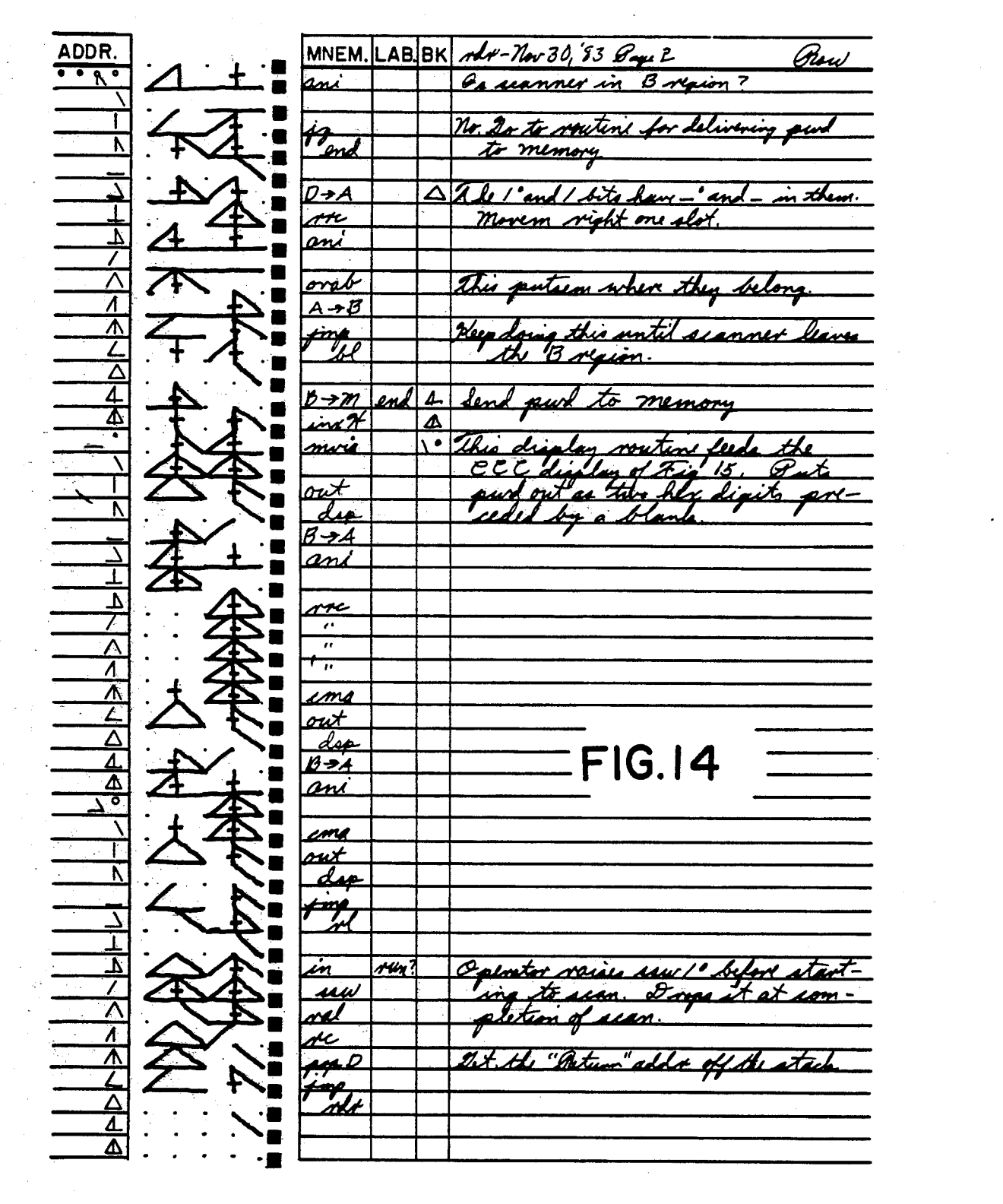

FIGS. 13 and 14 are sample coding sheets. They present the program I used with the reader. The paper I used came from a pad purchased at a dime store. It carried a faint blue grid of squares approximately 5 mm on a side. Each of my characters was placed in three adjacent squares—a row of six squares for the two digits of the entry and one additional square for the indicium. Coding sheets of more nearly transparent paper and having dots at the vertices of the triangles and another dot at the bottom of the altitude—would be better. Such coding sheets are depicted in FIG. 13 and FIG. 14.

FIG. 13 shows the conventional columns of information entered on a printed form.

Address Column

The least significant digit of each address is preprinted. The programmer enters such remaining digits as are appropriate.

Code Column

Digits are entered by the programmer. A dull lead pencil is used. This permits a simple erasure for correcting an entry. Line width for the prototype was about three-fourths of a millimeter. The preprinted dots aid the programmer in positioning the lines of the digits. Knowledge of what the scanner looks for and what it does not look for—permits the programmer to concentrate on which portions of the digits are important. The square block indicia are preprinted.

Mnemonic and Label Columns

Standard columns of the general coding sheet.

Block Column

Indicates which block of the flowchart is implemented by the following several steps.

Comment Column

Standard column of general coding sheet.

With a little practice, one can write computer compatible digits(numerals) as fast or faster than he can write Arabic numerals. But a little extra care must be used in writing the coding digits. The insertion of the crossbars on the two digits is an extra step. But with practice one can enter the code quite rapidly.

The program shown is that used in conjunction with the prototype reader for inputting material via the reader. It loaded the material into consecutive positions in memory and fed the material to the display. The display always shows the last five entries. The program should be modified to cause the address to be displayed in the leftmost four display characters. Checking the display address vs the last address on a page would permit the operator to know if an error involving too few or too many entries had been made. The chance of an error is very remote, but noise of sufficient severity to cause such errors may be expected.

Figure 15:
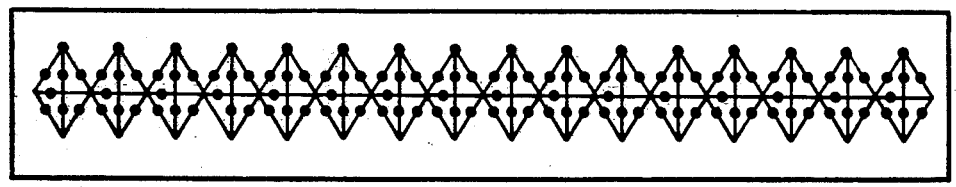
FIG. 15 is a view of a prior art display for displaying information in computer compatible character form.

The display referred to in lines beginning at address zero-one-five-one appears in FIG. 15. Sixteen characters in a row. Each character consists of seven lines and an apex dot. Lines are white on a black background. The dots in the lines (and the apex dot) are leds. A lit led indicates that the associated line is to be considered active in the character. The display is fed by sixteen shift registers each having eight bits. Each register feeds a respective series of eight bits in eight successive characters. The digit of present interest appears in the upper half of the Computer Compatible Character of FIG. 1. The routine beginning at zero-one-five-one takes pwd and outputs two words to the display appropriate for producing pairs of digits separated from each other by blanks. This display has proven very effective as well as economical. In general use it displays alphanumics. It provides one hundred (hex) characters.

CLOSING COMMENTS

The computer may be replaced by a programmable logic array. Much more economical. The preferred system uses the PLA to program an Eprom—as indicated in FIG. 11.

In the preferred embodiment the reader is used to read the code column on a coding sheet. In a second application it is used to read entries on an inventory sheet.

A similar system can be used to scan a horizontal row of characters. Full alphanumerics may be handled using characters such as shown in FIG. 1.

Reliability of reading may be improved by employing a second indicium position to cover the A region of FIG. 9. No extra work is involved if preprinted forms bearing the two indicia are used.

Reliability can be further improved by increasing the number of elements in the character and using one of several Hamming codes.

Fiber optics will not be used in future systems. Miniaturized detectors are now available which can be positioned in the faceplate.

A cover to prevent ambient light from reaching the fibers would help.

A better reflector system would permit operation with only one lamp.

A paper more nearly transparent to the infra-red radiation sensed by the sensors would help.

A lamp specially adapted for infrared radiation would be better than the plain pilot lamp used in this prototype.

A sprocket-fed paper coming in a roll (or even fanfold) would permit longer programs to be read expeditiously. Speed of reading should then be the same as for the reading of paper tape in a tape reader.

Most significant is the fact that entries are made with a lead pencil. This is the instrument which programmers are practiced in using. It is also the instrument used by inventory takers. In both cases, entries can be quickly erased and changed. And the scanning system used permits numeral configurations to be as sloppy as most handwriting. But most surely not as sloppy as some.

I claim:

1. In a system for machine reading a set of computer compatible characters;

each of said characters comprising a respective subset of the elements of a master character, said master character comprising a set of elements;

said characters being divided into character subsets of one or more characters each, each of said subsets being termed an entry;

a medium on which said entries are entered in an array suitable for being scanned by a set of sensors;

each of said sensors scanning along a respective path;

space occupied by each of said entries being divided into a set of zones;

intersections of said paths and said zones being termed blocks;

the arrangement of said zones and said paths being such that for each element of said characters there is a respective block of said blocks through which said element passes and no other of said elements passes;

each of said zones bearing a respective set of indicia;

each indicium of said sets of indicia delineating the extent of its respective zone;

the combination of said indicia appearing in (a zone) each of said zones associated with the reading of (one) each of said entries being different from the combination appearing in any other zone associated with the reading of said entry;

each of said combinations constituting a zone code identifying its respective zone;

said sets of indicia being positioned in an orderly manner to facilitate scanning;

each of said entries plus associated indicia (associated with the reading of said entry) constituting an (expanded) extended entry;

(elements of said characters) character elements and said indicia constituting items to be sensed;

a scanner having a set of sensors;

said scanner being adapted for causing each of said sensors to scan along a respective (paths) path of said paths;

said scanner being further adapted for developing a reader (ord) word indicating at any instant of time which items of said items to be sensed are sensed;

an output register adapted for storing a processor word composed of bits; each of said bits having a respective element in the entry being scanned; and a processor adapted in response to (said) each reader (words) word generated during scan of (one) each of said (expanded) extended entries, for causing each bit in said output register to assume its HI state if and only if said respective element of said bit is present in said entry.

2. A system as in claim 1;

said scanner being adapted for generating an end signal indicating end of scan for an entry which has just been scanned;

said processor being adapted in response to said end signal for delivering contents of said output register to a using device; and said processor being further adapted for subsequently moving the bits of said output register to their LO state.

3. A system as in claim 1;

said characters being numerals;

each of said numerals being composed of elements drawn from the elements of a master numeral, said master numeral comprising a set of elements;

a first element of said master numeral having a respective weight of "1";

a second element of said master numeral having a respective weight of "2";

a third element of said master numeral having a respective weight of "4";

a fourth element of said master numeral having a respective weight of "8"; and each of said numerals comprising that combination of said first, second, third, and fourth elements the sum of whose respective weights equals the number represented by said numeral.

4. A system as in claim 3;

said master numeral being an approximately isosceles triangle with altitude dropped to the base;

the right side being weighted "1";

the altitude being weighted "2";

the base being weighted "4"; and the left side being weighted "8".

5. A system as in claim 4;

said medium being a code sheet bearing said entries in its code column;

each of said entries comprising a pair of said numerals;

each of said entries having elements designated 1, 2, 4, 8, 10, 20, 40, and 80;

each of said entries having two associated zones of said zones;

the first of said associated zones bearing a Space indicium;

the second of said associated zones bearing a Mark indicium;

said scanner being adapted for scanning down the column of said entries;

said scanner including a set of sensors;

a first of said sensors traversing a path covering said indicia and not traversing any of said elements;

a second of said sensors traversing a path covering the approximate centers of said "1" elements;

a third of said sensors traversing a path covering approximately said "2" elements;

a fourth of said sensors traversing a path covering the approximate centers of said "8" elements;

a fifth of said sensors traversing a path covering the approximate centers of said "10" elements;

a sixth of said sensors traversing a path covering approximately said "20" elements; and a seventh of said sensors traversing a path covering the approximate centers of said "80" elements.

6. A system as in claim 1 and including;

a transparent platen adapted for holding said medium in scanning position;

said scanner including optical fibers the free ends of which terminate in a faceplate;

said scanner being adapted for moving said faceplate down said column of numerals and associated indicia, causing each of said sensors to scan a respective one of said paths;

said reader having a source of radiation mounted on an undercarriage, said undercarriage being adapted for movement with said scanner in such manner that said source is always directly under said faceplate; and ends of optical fibers opposite said free ends terminating in a set of optical sensors.

7. A system as in claim 1;

a subset of said character elements being lines lying in the direction of scan; and each of said elements of said subset bearing a crossbar.

8. In a system for machine reading a set of computer compatible characters;

a medium bearing said characters plus a plurality of indicia;

said characters and said indicia being positioned on said medium to accommodate orderly scanning by a scanner;

said scanner being adapted for sensing said indicia and elements of said characters;

said scanning being along paths traversing said characters and said indicia;

said indicia being positioned to define a set of zones traversing said characters in a direction approximately perpendicular to said paths;

the intersection of each of zones with each of said paths forming a block;

the arrangement of said paths and said zones being such that for each element of said characters there is a respective block through which said element and only said element (only), passes; and each of said zones associated with the reading of one of said characters bearing a combination of said indicia differing from the combination borne by any other zone associated with the reading of said (character) character.

9. In a system as in claim 8 for machine reading computer compatible characters, further comprising a processor and an output register;

the scanner of claim 8; and a processor and an output register;

said output register having a set of bits, each of said bits having a HI state and a LO state;

each element of an entry being scanned having a respective bit in said output register;

in response to said signals, said processor being adapted for causing said respective bit of each of said elements present in said entry to assume its HI state (.); and in response to said signal, said processor being further adapted for delivering the contents of said output register to a receiver at completion of scan of said entry, and for subsequently moving all bits of said register to their LO state.

10. In a system for machine reading a computer compatible character composed of character elements;

a medium bearing said character;

said character being traversed in a first direction by a set of zones;

each of said zones containing a respective set of indicia;

the combination of said indicia appearing in each of said zones being different from the combination appearing in any other zone of said zones; said combination constituting a zone code identifying said zone;

said character and said indicia being traversed in a second direction by a set of paths, said paths being generally perpendicular to said zones;

the intersections of said paths and said zones being termed blocks; and the arrangement of said paths and said zones being such that for each of said character elements there is a respective block of said blocks through which said character element and only said character passes.

11. In a system as in claim 10 for machine reading of computer compatible characters, said medium bearing additional characters to be read;

the character of claim 10 being hereafter referred to as a "first character";

said first character, said indicia, and said additional characters constituting an entry;

said additional characters being in line with said first character and in such direction that said zones extend across said additional characters;

said additional characters being traversed by additional paths;

zone and path patterns over said additional characters being identical to zone and path patterns over said first character.

12. In a system as in claim 11 for machine reading of computer compatible characters, said medium bearing additional entries to be read;

said entry of claim 11 being hereafter referred to as a "first entry";

the character positions, indicia positions, zone pattern, and path pattern for each of said additional entries being identical to the character positions, indicia positions, zone pattern, and path pattern of said first entry; and said additional entries being in line with said first entry and in such direction that each of said paths is continuous between successive entries.

* * * * *

UNITED STATES PATENT AND TRADEMARK OFFICE
CERTIFICATE OF CORRECTION

PATENT NO. : 5,195,146
DATED : Mar. 16, 1993
INVENTOR(S) : Ranald O. Whitaker

It is certified that error appears in the above-indentified patent and that said Letters Patent is hereby corrected as shown below:

Columns 9 and 10, delete claim 1, to read as follows:

1. A system for machine reading a set of computer compatible characters;

each of said characters comprising a respective subset of character elements drawn from the elements of a master character;

said system including a medium, a scanner, a processor, and an output register;

said medium bearing said characters;

said characters being divided into character subsets;

each of said character subsets having an associated respective set of indicia;

each of said character subsets and its respective set of indicia constituting an entry;

a first indicium of said indicia being a Mark and a second indicium of said indicia being a Space;

UNITED STATES PATENT AND TRADEMARK OFFICE
CERTIFICATE OF CORRECTION

PATENT NO. : 5,195,146
DATED : Mar. 16, 1993
INVENTOR(S) : Ranald O. Whitaker

It is certified that error appears in the above-indentified patent and that said Letters Patent is hereby corrected as shown below:

characters and indicia of each of said entries constituting items to be sensed;

each of said entries having associated with it a set of zones traversing said items to be sensed;

each of said zones being defined by boundaries of its respective set of said indicia;

the combination of said indicia appearing in each zone of said zones of said entry being different from the combination appearing in any other zone of said entry, said combination constituting a zone code identifying said zone;

said entries being arranged on said medium in an orderly array suitable for being scanned by said scanner;

said scanner having a set of sensors;

said scanner being adapted for causing each of said sensors to scan a respective path traversing said items to be sensed, said path being approximately perpendicular to said zones;

UNITED STATES PATENT AND TRADEMARK OFFICE
CERTIFICATE OF CORRECTION

PATENT NO. : 5,195,146
DATED : Mar. 16, 1993
INVENTOR(S) : Ranald O. Whitaker

It is certified that error appears in the above-indentified patent and that said Letters Patent is hereby corrected as shown below:

the intersections of said paths and said zones being termed blocks;

the arrangement of said zones and said paths being such that for each character element of said entry there is a respective block through which said character element and only said character element passes;

said scanner being adapted for developing a reader word (RWD) composed of bits and indicating at any instant of time which items to be sensed are present;

said output register being adapted for storing a processor word (PWD) composed of bits, each of said bits having a respective character element in the entry being scanned, each of said bits having a HI state and a LO state, each of said bits being normally in its LO state: and

UNITED STATES PATENT AND TRADEMARK OFFICE
CERTIFICATE OF CORRECTION

PATENT NO. : 5,195,146
DATED : Mar. 16, 1993
INVENTOR(S) : Ranald O. Whitaker

It is certified that error appears in the above-indentified patent and that said Letters Patent is hereby corrected as shown below:

said processor being adapted in response to said RWD's generated during scan of each of said entries, for causing each bit in said output register to assume its HI state if and only if said respective character element of said bit is present in said entry.

Column 11, delete claim 8, to read as follows:

8. In a system for machine reading computer compatible characters, each of said characters comprising a respective subset of character elements drawn from the set of elements of a master character;

a medium and a scanner;

said medium bearing both said characters and a plurality of indicia;

said characters and said indicia being divided into entries;

each of said entries including a respective subset of said characters and a respective subset of said indicia;

UNITED STATES PATENT AND TRADEMARK OFFICE
CERTIFICATE OF CORRECTION

PATENT NO. : 5,195,146
DATED : Mar. 16, 1993
INVENTOR(S) : Ranald O. Whitaker

It is certified that error appears in the above-indentified patent and that said Letters Patent is hereby corrected as shown below:

said entries being positioned on said medium to accommodate being scanned in succession by said scanner;

said scanner including sensors adapted for sensing said character elements and said indicia;

said scanner being adapted for causing each of said sensors to scan a respective path traversing said entries in a first direction;

for each of said entries said respective indicia defining a set of zones traversing said characters in a second direction approximately perpedicular to said paths;

the intersection of each of said zones with each of said paths forming a respective block;

the arrangement of said paths and said zones being such that for each of said character elements there is a respective block of said blocks through which said character element and only said character element passes;

UNITED STATES PATENT AND TRADEMARK OFFICE
CERTIFICATE OF CORRECTION

PATENT NO. : 5,195,146
DATED : Mar. 16, 1993
INVENTOR(S) : Ranald O. Whitaker

It is certified that error appears in the above-indentified patent and that said Letters Patent is hereby corrected as shown below:

each of said zones associated with the reading of each of said entries bearing a combination of said indicia differing from the combination borne by any other zone associated with the reading of said entry, said combination constituting a zone code identifying said zone; and the pattern of said zones and said indicia being identical for each of said entries.

Columns 11 and 12, delete claim 9 to read as follows:
9. In a system for machine reading computer compoatible characters;

the medium and scanner of Claim 32 plus a processor and an output register;

said output register having a set of output bits, each of said output bits having a HI state and a LO state, said output bits being normally in their LO state;

UNITED STATES PATENT AND TRADEMARK OFFICE
CERTIFICATE OF CORRECTION

Page 7 of 8

PATENT NO. : 5,195,146
DATED : Mar. 16, 1993
INVENTOR(S) : Ranald O. Whitaker

It is certified that error appears in the above-indentified patent and that said Letters Patent is hereby corrected as shown below:

during scan of one of said entries, each character element of said entry having a respective output bit in said output register;

in response to sensing of said character elements and said indicia of said entry being scanned, said scanner being adapted for developing a set of scanner output signals;

in response to said scanner output signals, said processor being adapted for causing said respective output bit of each of said character elements present in said entry being scanned, to assume its HI state; and in response to said scanner output signals, said processor being further adapted for delivering the contents of said output register to a receiver at completion of scan of said

UNITED STATES PATENT AND TRADEMARK OFFICE
CERTIFICATE OF CORRECTION

PATENT NO. : 5,195,146
DATED : Mar. 16, 1993
INVENTOR(S) : Ronald O. Whitaker

It is certified that error appears in the above-indentified patent and that said Letters Patent is hereby corrected as shown below:

entry, and for subsequently moving all bits of said output register to their LO state."

Col. 12, Line 58. Beginning with "said" form the remainder of the paragraph into a new paragraph.

Col. 4, Line 47. After "this" insert --is--.

Col. 6, Line 6. Delete "Electric". Insert --Electronic--.

Col. 12, Line 45. After ";" insert --and--.

Signed and Sealed this

Thirteenth Day of December, 1994

Attest:

BRUCE LEHMAN

*Attesting Officer*  *Commissioner of Patents and Trademarks*